Nov. 9, 1926.  1,606,391
W. B. SCHULTE
DRY BATTERY
Filed Jan. 2, 1925  2 Sheets-Sheet 1
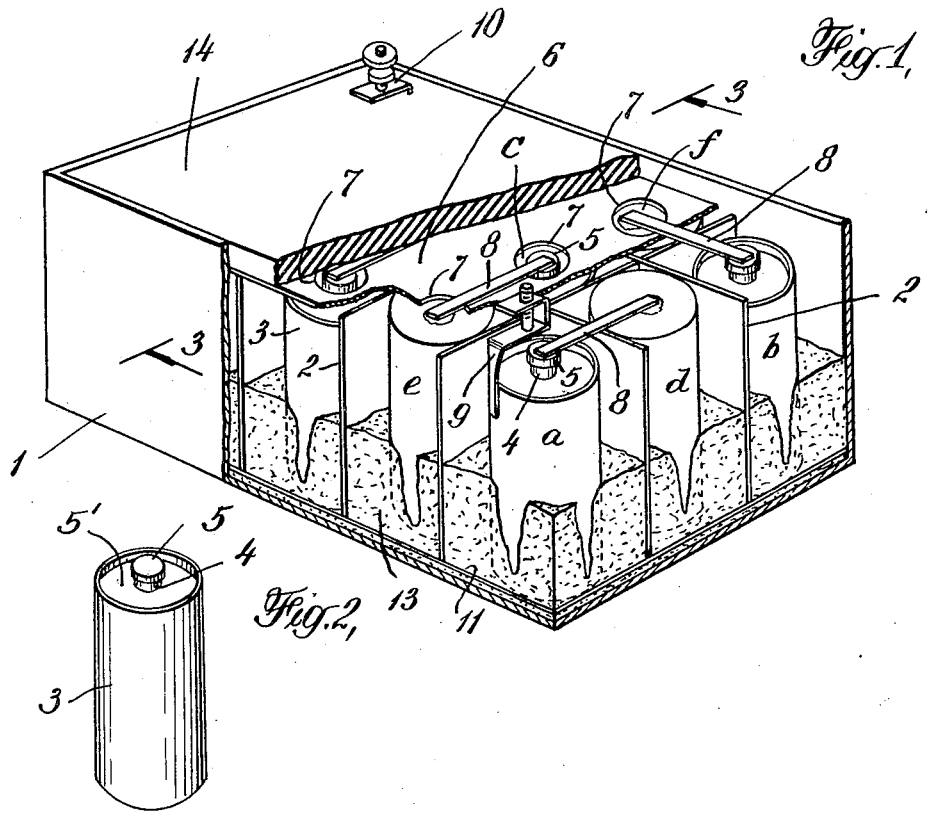
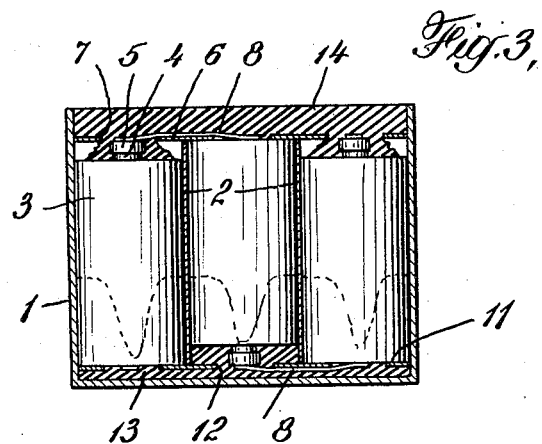
INVENTOR
Walter B. Schulte
BY
Pennie, Davis, Marvin, Edmonds,
ATTORNEYS.

Nov. 9, 1926.
W. B. SCHULTE
DRY BATTERY
Filed Jan. 2, 1925   2 Sheets-Sheet 2
1,606,391
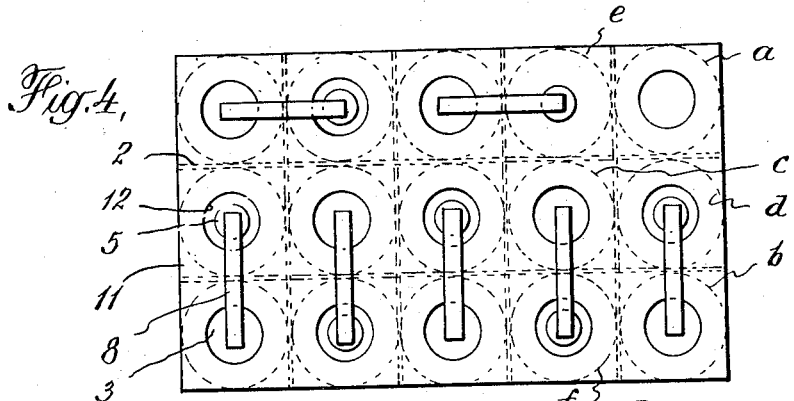
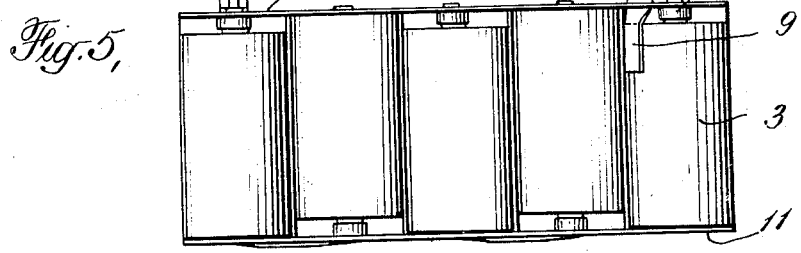
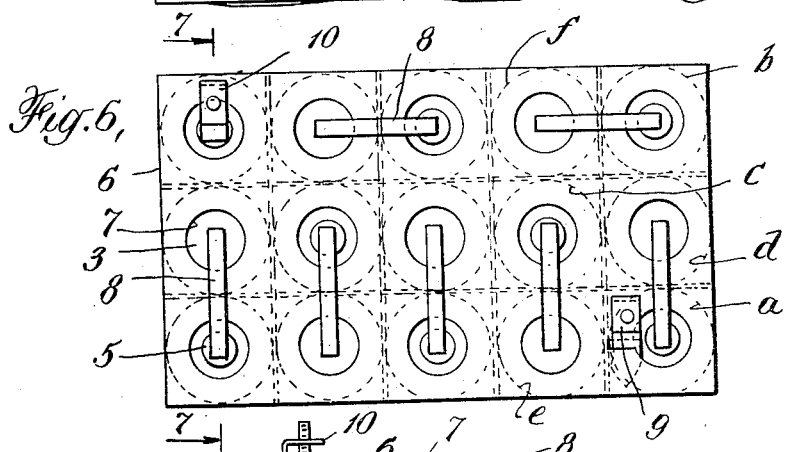
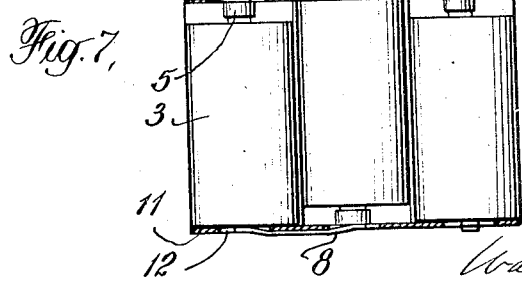

Patented Nov. 9, 1926.

1,606,391

UNITED STATES PATENT OFFICE.

WALTER B. SCHULTE, OF MADISON, WISCONSIN, ASSIGNOR TO BURGESS BATTERY COMPANY, OF MADISON, WISCONSIN, A CORPORATION OF WISCONSIN.

DRY BATTERY.

Application filed January 2, 1925. Serial No. 3.

This invention relates to dry batteries and particularly to the type commonly used in radio communication systems and ordinarily referred to as "B" batteries.

One object of the invention is to provide a dry battery of improved construction.

Another object is to provide a dry battery so constructed that the usual method of manufacture is simplified, facilitated and made less expensive.

A further object is to provide an improved method of assembling a dry battery.

The accompanying drawings illustrate one type of battery made in accordance with the invention and also illustrate the method of assembling it. In the drawings:

Fig. 1 is a perspective view of the battery with certain portions broken away to expose the interior construction;

Fig. 2 is a perspective view of one of the cells of the battery;

Fig. 3 is a transverse section on the line 3—3 of Fig. 1; and

Figs. 4 to 7 inclusive are different views of the group of cells before insertion into the container and illustrate the various steps involved in assembling the cells and interconnecting them to form a unit; Fig. 4 being a plan view of that face of the group of cells which ultimately becomes the lower face in the finished battery; Fig. 5 being a side elevation of Fig. 6; Fig. 6 being a plan view showing the group of cells of Fig. 4 in an inverted position, or, in other words, showing that face of the group of cells which is the uppermost face in the finished battery, and Fig. 7 being a transverse section taken on line 7—7 of Fig. 6.

The complete battery will first be described and this will be followed by a description of the method of assembling it. As shown in Figs. 1 and 3 the battery comprises a container 1, of any suitable shape. In the present instance it is of the type commonly employed for radio "B" batteries of the 22½ volt type composed of 15 cells connected in series. Positioned in the container 1 is a so-called nest 2 having longitudinal and transverse partitions serving to divide the interior of the container 1 into separate compartments for the cells. The nest 2 may be made of cardboard or any other suitable insulating material. Each compartment of the nest contains an electric cell which is preferably of the well-known type illustrated in Fig. 2. This type of cell comprises a cup-shaped zinc electrode 3 and a central carbon electrode 4 having attached to its upper end a metallic cap 5. The cell is provided with the usual seal 5' of pitch, sealing wax or the like. This general type of cell is hereinafter referred to as a cell of the "cup and central electrode type" or as a cell having a "cup shaped electrode and an electrode positioned centrally therein." The cells are so positioned that each alternate cell is inverted. For instance, it will be noted that in Fig. 1 cells $a$, $b$ and $c$ are in an upright position while cells $d$, $e$ and $f$ are in an inverted position and so on throughout the battery. The group of cells in the container is covered by a sheet of insulating material 6 which may be simply a piece of heavy paper, cardboard or the like. The sheet 6 is provided with a number of openings or perforations 7 each of which is designed to overlie one of the cells. The openings 7 provide access to the places on the cells at which the connectors are secured. Each metallic cap 5 of the upright cells, such as $a$, $b$, $c$ etc. is connected by means of a conductor 8 with the bottom of the cup 3 of the adjacent cell. For instance, the cap 5 of the carbon electrode of the cell $a$ is connected by means of the conductor with the bottom of the cup of the cell $d$. The cell $d$, however, being inverted, the bottom of the cup lies in substantially the same horizontal plane as the metallic cap 5 and therefore the connection between all of the cells may be made by straight, substantially horizontal connectors. Likewise, the metallic caps of cells $b$ and $c$ are respectively connected by similar conductors 8 with the bottom of the cups of cells $f$ and $e$ and so on throughout the series of cells. The conductors 8 are preferably in the form of flat metallic strips having sufficient rigidity to bind all of the cells together into a self-sustaining unit as hereinafter described. The connections between the conductors 8 and the cells may be made by soldering the conductors directly to the metallic caps 5 and to the bottoms of the cups. The sheet of insulating material serves to insulate the conductors from the cells at all places except those at which the connection is actually effected, namely at the places exposed by the openings 7. The end cell $a$ has a terminal 9 of any suitable type, connected to its cup electrode and the other end cell of the battery has a corresponding terminal 10 connected to the metallic cap 5 on the central electrode 4 of that cell. Other terminals may be provided if desired, connected to appropriate cells for permitting different voltages to be tapped from the battery in the well-known manner. The arrangement of the complete set of conductors and terminals at the top of the battery is shown in Fig. 6.

The metallic caps on the central electrodes of the inverted cells such as $d$ and $f$ are also connected by conductors 8 to the bottom of the cups of the respective adjacent cells, such as $b$ and $c$. The arrangement of the conductors at the bottom of the group of cells is shown in Fig. 4. It will now be seen that the two sets of conductors in conjunction serve to connect all of the cells in series. Should it not be desired to connect all of the cells in series, the conductors should be so connected to the cells as to effect the desired arrangement.

A second sheet of insulating material 11, corresponding with and performing a similar function to the sheet 6, is located immediately below the group of cells. It is provided with openings or perforations 12 corresponding with the perforations 7 of the upper sheet and through which the lower conductors make connection with the electrodes of the cells. Before the group of cells is positioned in the container 1, hot sealing material, such as pitch or sealing wax, is poured into the container to seal the lower ends of the cells as hereinafter described. This sealing material in the finished battery is represented at 13. The top of the container is sealed with pitch, sealing wax or any other suitable sealing material 14, a portion of which flows down through the openings 7 in the insulating sheet 6 and seals the upper ends of the cells. The sealing material 14 also surrounds and forms a support for the terminals 9 and 10.

The method of assembling the battery is as follows: The cells are first positioned in the nest with the alternate cells in an inverted position as shown in Fig. 4. The sheet of insulating material 11, which ultimately becomes the lowermost sheet, is then positioned over the group of cells with the openings 12 substantially coinciding with the axes of the cells. The conductors 8 are then soldered to the metallic caps of the central electrodes of the upright cells and to the bottoms of the cups of the adjacent inverted cells, the connections between the conductors and the electrodes being effected through the openings in the sheet of insulating material 11. The entire group of cells is then inverted and the sheet of insulating material 6 is laid over the top of the group of cells. The remaining conductors 8 are then connected to the central electrodes of the now upright cells and to the bottoms of the cups of the adjacent, now inverted, cells as shown in Fig. 6. At this point, or later in the manufacture of the battery, the terminals 9 and 10 may be soldered to the electrodes of the end cells as also shown in Fig. 6. The group of cells with the conductors interconnecting them now constitutes a self-sustaining unit, the conductors being of sufficient rigidity to effect this as stated above. The unit so formed is now ready to be positioned in the container 1. Before doing so, hot molten sealing material, such as pitch, or sealing wax, is poured into the bottom of the container in sufficient quantity to seal the lower ends of the cells when the unit is inserted in the container. While the sealing material is still hot, the group of cells is dropped as a unit into the container 1 and the hot sealing material flows upwardly through the openings 12 in the insulating sheet 11 and part way up around the lower ends of the cells as shown in Fig. 1. This serves to effectively seal the lower ends of the cells. The sealing material 14 is then poured over the group of cells to seal the container 1. Some of the sealing material 14 flows downwardly through the openings 7 in the upper sheet 6 of insulating material and serves to effectively seal the upper ends of the cells.

Instead of attaching the uppermost or second set of conductors (shown in Fig. 6) to the cells before the group of cells is positioned in the container, the group of cells with the first set of conductors in place, may be inverted and inserted in the container before the conductors of the second set are applied.

It will now be seen that the battery is very compact in construction and is unusually strong and durable. The arrangement of the cells permits the use of flat strip-like conductors which are not likely to become broken; which serve to strengthen the battery and which permit the cells to be interconnected into a self-sustaining unit as above described. Moreover, the connection between the strip-like conductors and the electrodes of the cells may be easily effected and this operation is further facilitated by the fact that the two surfaces to which each of the conductors is soldered are in substantially the same horizontal plane. The bottom of the zinc cup presents a relatively large flat surface to which the strip-like conductor may be soldered and the top face of the metallic cap of an adjacent cell affords a corresponding relatively large flat surface to which the other end of the strip-like conductor may be soldered. The procedure of assembling the battery is materially facilitated and simplified by reason of the fact that the connections between the conductors and the electrodes of the cells is so easily effected, and by reason of the fact that the cells may be assembled and interconnected into a self-sustaining unit before they are positioned in the container.

I claim:

1. An electric battery comprising a container, a plurality of cells therein, each of said cells comprising a cup shaped electrode and a second electrode positioned centrally therein, each alternate cell being in an inverted position, rigid conductors between said cells, each conductor being permanently rigidly connected with the central electrode of one cell and the bottom of the cup shaped electrode of an adjacent cell, said conductors being located alternately at the top and bottom of the group of cells, and a fusible seal serving to seal the cells in the container.

2. An electric battery comprising a container, a plurality of cells positioned therein, means comprising a plurality of substantially flat rigid strips permanently electrically connecting said cells in series and rigidly mechanically connecting said cells, and a layer of sealing material covering the ends of said cells and constituting a seal for said container.

3. An electric battery comprising a container, a plurality of cells therein, each alternate cell being in an inverted position, rigid conductors electrically connecting adjacent cells, the conductors being located alternately at the top and bottom of the group of cells and being rigidly and permanently secured to said cells, a body of sealing material in the bottom of said container serving to seal the lower ends of the cells, and a seal at the top of said container covering the upper ends of said cells.

4. An electric battery comprising a container, a plurality of cells therein, each alternate cell being in an inverted position, a sheet of insulating material below said cells, a second sheet of insulating material extending over the upper ends of the cells, conductors between said cells serving to permanently connect adjacent cells, the conductors being located alternately at the top and bottom of the group of cells, said sheets of insulating material being provided with openings through which said conductors make connection with the cell electrodes, a body of sealing material located between the bottom of said container and the lower sheet of insulating material, and a seal located above the upper sheet of insulating material and constituting a seal for the container and the upper ends of said cells.

5. The method of assembling an electric battery which comprises grouping a plurality of electric cells, permanently and rigidly connecting all of said cells electrically to form a unit, pouring molten sealing material into a container positioning the unit comprising the group of cells in the container before the sealing material has hardened, and then sealing the container.

6. An electric battery comprising a container, a plurality of cells therein each of which comprises a cup shaped electrode and an electrode centrally positioned therein, the alternate cells being in an inverted position, a sheet of perforated insulating material below said cells and a second sheet of perforated insulating material above the cells, the perforations in said sheets substantially coinciding with the central axes of the cells, and conductors permanently connecting said cells, each conductor being connected with the central electrode of one cell and the bottom of the cup shaped electrode of an adjacent cell, the connections between said conductors and the electrodes being made through the perforations in said sheets.

7. An electric battery comprising a container, a nest positioned therein, a plurality of cells each of which is located in one of the compartments of said nest, each of said cells comprising a cup shaped electrode and an electrode arranged centrally therein, the alternate cells being in an inverted position, a sheet of perforated insulating material below said cells and a second sheet of perforated insulating material above the cells, the perforations in said sheets substantially coinciding with the axes of the cells, and conductors permanently connecting said cells, each conductor serving to connect the central electrode of one cell with the bottom of the cup shaped electrode of an adjacent cell, the connections between said conductors and the electrodes being made through the perforations in said sheets.

8. An electric battery comprising a container, a plurality of cells therein, each of said cells comprising a cup shaped electrode and an electrode positioned centrally therein, each alternate cell being in an inverted position, and substantially flat conducting strips connecting said cells, each strip being permanently secured to the central electrode of one cell and to the bottom of the cup shaped electrode of an adjacent cell whereby said cells are rigidly connected to form a unitary structure.

9. The method of assembling an electric battery which comprises grouping a plurality of electric cells, electrically connecting at least some of the cells, pouring molten sealing material into a container, positioning the group of cells in the container before the sealing material hardens and then sealing the container.

10. The method of assembling an electric battery which comprises grouping a plurality of electric cells of the cup and central electrode type and positioning alternate cells in an inverted position, electrically connecting at least some of the cells, pouring molten sealing material into a container, positioning the group of cells in the container before the sealing material hardens, and then sealing the container.

11. The method of assembling an electric battery which comprises grouping a plurality of electric cells of the cup and central electrode type and positioning alternate cells in an inverted position, securing conductors between the cells by connecting each conductor to the central electrode of one cell and to the bottom of the cup of an adjacent cell, positioning the group of cells as a unit in a container, and sealing the tops and bottoms of said cells into the container with a fusible seal.

12. The method of assembling an electric battery which comprises grouping a plurality of electric cells of the cup and central electrode type and positioning alternate cells in an inverted position, securing conductors between the cells by connecting each conductor to the central electrode of one cell and to the bottom of the cup of an adjacent cell, pouring molten sealing material in a container, positioning the group of cells as a unit in the container before the sealing material hardens and subsequently sealing the top of the container.

13. The method of assembling an electric battery which comprises grouping a plurality of electric cells of the cup and central electrode type and positioning alternate cells in an inverted position, securing a conductor to the central electrode of each upright cell and to the bottom of the cup of an adjacent inverted cell, inverting the group of cells and securing conductors to the now uppermost ends of the cells by connecting each conductor between the central electrode of one of the now upright cells and the bottom of the cup of an adjacent cell, positioning the group of cells as a unit into a container and then sealing the container.

14. The method of assembling a dry battery which comprises grouping a number of cells of the cup and central electrode type and positioning alternate cells in an inverted position, securing conductors between the central electrode of each upright cell and the bottom of the cup of an adjacent inverted cell, pouring molten sealing material in a container, positioning the group of cells in said container upon the molten sealing material with the conductors toward the bottom of the container, securing conductors to the exposed ends of the cells by connecting each conductor between the central electrode of one of the now upright cells and the bottom of the cup of an adjacent cell, and then sealing the top of the container.

15. The method of assembling an electric battery which comprises grouping a plurality of electric cells having a cup shaped electrode and a central electrode positioned therein, positioning alternate cells in an inverted position, securing a conductor to the central electrode of each upright cell and to the bottom of the cup shaped electrode of an adjacent inverted cell, pouring molten sealing material into a container, inverting the group of cells and positioning it in the container on the molten sealing material, securing conductors to the exposed ends of the cells by connecting each conductor between the central electrode of one of the now upright cells and the bottom of the cup shaped electrode of an adjacent cell, and pouring molten sealing material over all of the said cells to seal them in the container.

16. The method of assembling an electric battery which comprises positioning a plurality of cells of the cup and central electrode type in the compartments of a nest with alternate cells in an inverted position, covering the group of cells with a sheet of insulating material having perforations each of which substantially registers with the axis of one cell, securing conductors between the central electrode of each upright cell and the bottom of the cup of an adjacent cell through the perforations in said sheet, pouring molten sealing material in a container, inverting the group of cells assembled as above described and positioning it in the container on the molten sealing material over the top of the inverted group of cells with the perforations in substantial alignment with the axes of the cells, securing conductors to the exposed ends of the cells by connecting each conductor to the central electrode of one of the now upright cells and the bottom of the cup of an adjacent cell through one of said openings, and pouring molten sealing material over said last named sheet of insulating material to seal the cells in the container.

17. The method of assembling an electric battery which comprises positioning a plurality of cells of the cup and central electrode type in the compartments of a nest with alternate cells in an inverted position, securing conductors between the central electrode of each upright cell and the bottom of the cup of an adjacent cell, inverting the group of cells and positioning the same in a container, securing conductors to the exposed ends of the cells by connecting each conductor between the central electrodes of one of the now upright cells and the bottom of the cup of an adjacent cell, and sealing the group of cells in the container.

In testimony whereof I affix my signature.

WALTER B. SCHULTE.